Figure 1:
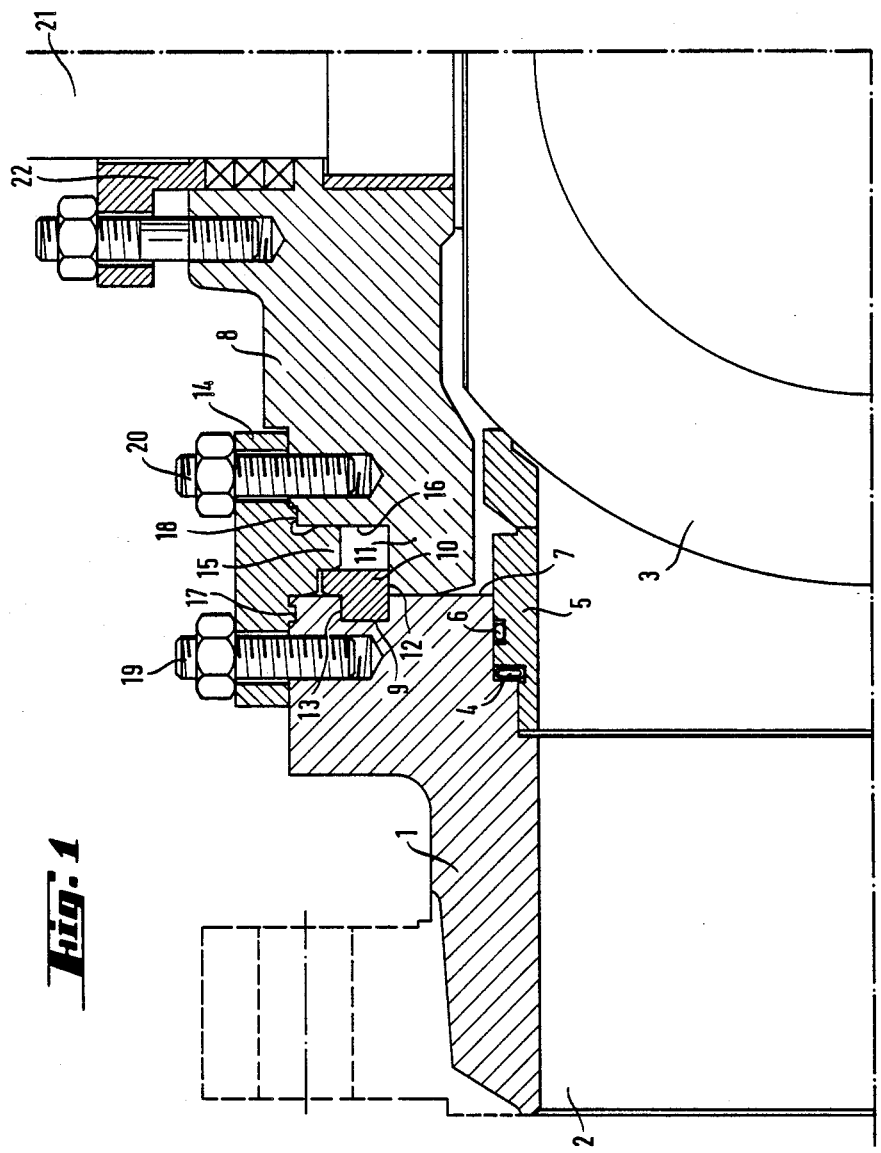

United States Patent [19]

Kivipelto

[11] Patent Number: 4,928,924
[45] Date of Patent: May 29, 1990

[54] VALVE

[75] Inventor: Pekka J. Kivipelto, Helsinki, Finland

[73] Assignee: Neles Oy, Helsinki, Finland

[21] Appl. No.: 428,003

[22] Filed: Oct. 27, 1989

Related U.S. Application Data

[63] Continuation of Ser. No. 258,589, Oct. 17, 1988, abandoned.

[30] Foreign Application Priority Data

Oct. 21, 1987 [FI] Finland ................................. 874642

[51] Int. Cl.[5] .............................................. F16K 5/06
[52] U.S. Cl. ........................................ 251/315; 251/367
[58] Field of Search ................ 251/315, 304, 367, 309

[56] References Cited

U.S. PATENT DOCUMENTS

| | | | |
|---|---|---|---|
| 4,423,749 | 1/1984 | Schmitt | 251/315 X |
| 4,634,098 | 1/1987 | Varden | 251/315 X |

*Primary Examiner*—John C. Fox
*Attorney, Agent, or Firm*—Cushman, Darby & Cushman

[57] ABSTRACT

A valve, which consists of a housing (1) provided with a through flow duct (2); of a closing member (3), which is shaped as a body of revolution or as a part of such body, which has been placed into the housing through an opening (7) provided on the housing, and which is fitted in the through flow duct turnably or rotably; of sealing members (5,6) fitted between the closing member (3) and the housing (1); of a cover (8) that covers the opening (7) in the housing as pressure-proof; of locking and sealing members (9,10,14) for locking and sealing the cover (8) on the housing (1); as well as of sealing members (22) for sealing the turning shaft (21) of the closing member. The cover (8) is supported against the pressure force by means of a stop face (12) placed at the circumference of the opening (7) on the housing and facing towards the interior of the housing. The cover (8) is locked on the housing (1) by means of an annular auxiliary cover (14) fitted outside the cover, said auxiliary cover being attached detachably both to the housing (1) and to the cover (8) and being provided with sealing members (17,18) both between the auxiliary cover (14) and the housing (1) and between the auxiliary cover (14) and the cover (8).

4 Claims, 2 Drawing Sheets

VALVE

The invention concerns a valve, which consists of a housing provided with a through flow duct; of a closing member, which is shaped as a body of revolution or as a part of such body, which has been placed into the housing through an opening provided on the housing, and which is fitted in the through flow duct turnably or rotably; of sealing members fitted between the closing member and the housing; of a cover that covers the opening in the housing as pressure-proof; of locking and sealing members for locking and sealing the cover on the housing; as well as of sealing members for sealing the turning shaft of the closing member, the cover being supported against the pressure force by means of a stop face placed at the circumference of the opening on the housing and facing towards the interior of the housing.

The object of the present invention is to provide a valve which can be serviced and repaired readily without detaching the valve from the pipe system, an example of use being welded valves in pipelines. In the present-day technology, increasing use is made of pipelines in which the components of the line are welded into an integrated, sealed pipeline. An advantage of the method is that an outwardly sealed pipe system is provided, which is an important property in the case of transfer of flammable or otherwise dangerous media. A conventional welded valve involves the drawback that servicing and repair of the valve becomes difficult. The requirements imposed on the sealing of the valves and the erosion and corrosion produced by the medium, however, make it necessary to carry out servicing and repair work on the valves. The repair work is usually carried out by replacing the whole valve in the line. The welding of the new valve into the existing line is a difficult step of work, because any tensile strains present in the line may have shifted the pipe ends longitudinally. The same phenomenon is also encountered when a pipeline valve provided with flange joints is detached from the pipe.

In view of making the servicing and repair work quicker, a so-called "Top-Entry" construction has been developed. In this type, the components that maintain the pressure outwards are a valve housing consisting of one part and provided with an installation and servicing opening as well as a cover that closes this opening and is provided with sealing members, the turning shaft of the closing member being passed through said cover by means of suitable sealing members.

A common alternative embodiment is such that the housing bears the tensile and bending strains applied to the pipe system alone or substantially alone, and the cover bears only the pressure force applied to it. An example of a construction of this type is the German Published Patent Application No. 2,150,628. It is typical of the construction that the cover is locked against the pressure force by means of a lock ring and that the cover is sealed relative the housing along the outer circumference of the cover by means of one or several O-ring seals. The solution is advantageous and operative in the case of small valves, but in the case of large valves and high pressures the ability of the housing to withstand the deformations caused by strains occurring in the pipe system is lowered remarkably. As a result of this, the opening in the valve housing becomes oval, and this deformation may be a so-called permanent deformation. In view of the operation and servicing of the valve, the situation is bad, for the play between the housing and the cover, which was suitable when the valve was assembled originally, may become jamming and, on the other hand, excessively large in view of the soft seal, so that the seal may be pushed out by the effect of the pressure. In connection with the servicing work, the sealing face is readily damaged when a cover of an excessively large diameter is mounted into an oval housing. Nor is this solution suitable for high temperatures or when the so-called "Fire-safe" quality is required from the valve.

Another form of construction that is used commonly is a cover attached by means of screws, of which an example is the U.S. Pat. No. 3,920,036. In this construction, the fastening screws of the cover bear the pressure force applied to the cover as well as any pre-tightening force that may be required by a plane gasket, if any. The construction is not so sensitive to deformations of the opening, because, by the effect of the friction force, the cover bears part of the strains derived from the pipe system, and the construction of the housing must be made considerably more massive at the opening in order that the necessary fastening screws could be attached to the housing. In this construction, the sealing of the cover takes place either in the plane of the cover or on the circumference of a cylindrical shoulder. A drawback of the construction is its high cost. For the circle of screws, an annular addition of material must be made to the housing and to the cover, the proportion of said addition in the total weight being considerable. When the fastening point of the cover is displaced further to the outer circumference, the increased bending torque must be compensated for by increasing the thickness of the cover. The bending torque is produced by the pressure force acting upon the cover. An increased diameter of the cover results in an increased constructional length of the valve and, as a result of that, it is difficult to meet the length requirements imposed on valves by the standards that govern the manufacture of and trade in valves. The assembling of the valve is slow in particular if the gasket of the cover is plane. In order that a tight joint could be obtained, the screws of the cover must be tightened carefully and systematically step by step, and the work becomes ever slower as the screws become larger.

The valve in accordance with the present invention is characterized in that the cover is locked on the housing by means of an annular auxiliary cover fitted outside the cover, said auxiliary cover being attached detachably both to the housing and to the cover and being provided with sealing members both between the auxiliary cover and the housing and between the auxiliary cover and the cover. In the construction in accordance with the present invention, it has been possible to combine the good sides of both of the prior-art types, at the same time as most of the known drawbacks have been eliminated. In the construction, as the pressure-proof primary cover, it is possible to use a cover whose outer diameter is only slightly larger than the closing member. In view of the mounting of the closing member, the diameter is preferably 2 to 30 mm larger than the outer diameter of the closing member, depending on the size of the valve. The primary cover is locked against pressure by means of an advantageous, space-saving lock-ring locking. The play between the cover and the housing can be fitted such that possible deformations do not hamper servicing installation, because any change in the play does not affect the seal. The sealing of the cover is carried out by means of a separate sealing cover, which is sealed at the same time against the housing and against the primary cover. The pressure force acting upon the sealing cover remains low because of the narrow annular pressure-face area and permits the use of small screws and plane gaskets at the same time. The available choice of plane gasket qualities is large, and the construction is suitable for a wide range of temperatures from cryo conditions to high-temperature conditions by just changing the quality of the gaskets.

Figure 2:
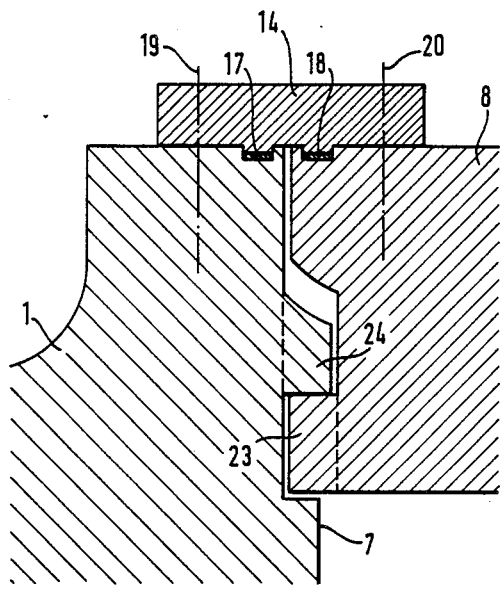
Figure 3:
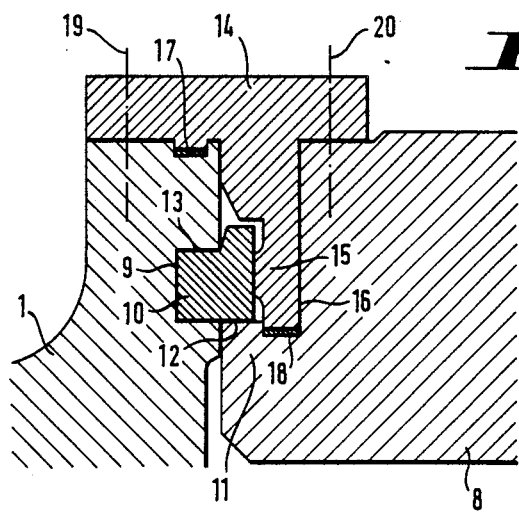

The invention and its details will come out in more detail from the following description and from the accompanying drawings, wherein FIG. 1 is a partial sectional view of a cover sealing arrangement in accordance with the invention, FIG. 2 shows a detail of a second embodiment of the invention on a larger scale, and FIG. 3 also shows a detail of a third embodiment.

The valve in accordance with the invention shown in FIG. 1 comprises a housing 1, which is provided with a flow duct 2. The cross-sectional shape of the flow duct varies depending on the shape of the closing member. In the figure a valve is shown which has a spherical closing member 3, in which case the flow duct 2 is most appropriately circular. In the flow duct in the housing 1, in a stepwise recess 4 machined in a plane perpendicular to the duct, a closing seal 5 is fitted, which blocks the flow tightly in the closed position of the valve and which is sealed relative the housing by means of a seal 6.

Into the installation or servicing opening 7 placed at the top side of the housing 1, a primary cover 8 is placed, which closes the opening and which is locked as pressure-bearing in a groove 9 machined into the opening 7 by means of a multi-component lock ring 10 fitted in a plane parallel to the cover 8. The pressure load directed at the area of the opening 7 is transferred mainly via a shoulder 11 made onto the cover 8 to the lower face 12 of the lock ring 10 and further, via the upper face 13 provided in the groove 9 in the lock ring 10, to the housing 1.

By means of calculation, it is difficult to determine the proportion of the load that is transferred via the lock ring out of the total load, because the fastening screws 19 of the sealing cover 14 used for ultimate sealing of the opening 7, provided in the housing, bear a minor part of the load. Owing to the high load, the lock ring 10 must be made rigid, and it again follows from this that the lock ring consists of several parts, otherwise it could not be fitted into the groove 9. The lock ring has been cut-off into several parts so that the total length of the parts is smaller than the entire circumferential length of a whole ring. The slackness permits the fitting of the last piece into its position. On the other hand, the shoulder 11 on the cover is wide enough so that the part of the lock ring can be placed onto the shoulder 11 on the cover in the opening 7 before the lock ring part is placed into the groove 9. The keeping of the lock ring in the groove is ensured by means of a cylindrical cam 15 provided on the sealing cover 14 and projecting downwards from the sealing cover. The outer diameter of the cam fits inside the smallest face of revolution of the lock ring with a suitable play and prevents the lock ring parts from coming out of the groove. The inner diameter of the cam rests against the cylinder part 16 belonging to the shoulder 11 on the cover.

The sealing cover 14 blocks the access of the medium through the gap between the housing and the cover by forming a solid sealing circle between the housing and the sealing cover by means of the seal 17 and between the primary cover and the sealing cover by means of the seal 18. The seals 17 and 18 may be elastic profiled seals, e.g. 0-ring seals, or plane seals, e.g. graphite plane seals. The sealing cover is locked onto the housing by means of screws 19 and onto the primary cover by means of screws 20. The load acting upon the screws is derived from the annular pressure area, whose inner diameter is approximately equal to the middle diameter of the seal 18 and outer diameter approximately equal to the middle diameter of the seal 17 and from any pre-tensioning force that may be required by the seals. The turning shaft 21 of the closing member 3 is passed through the cover 8 and sealed by means of the sealing members 22.

The invention is not confined to the alternative described above alone, but it may show variation in different ways within the scope of the patent claims. For example, in stead of a circular cover and opening and lock ring, it is possible to use a cover and an opening whose radius is not invariable over the entire circumference. In such a case, when the cover is being placed into its position, it is rotated finally, whereby the cover parts of larger radius become placed inside the opening part of smaller radius. This so-called bayonet mount permits a construction in which the sealing cover 14 and the screws 19, 20 are of a more advantageous size. This embodiment is shown in FIG. 2. The primary cover 8 has radial projections 23 on its circumference, which said projections fit into corresponding recesses provided on the circumference of the service opening 7. Between the recesses at the service opening 7, inwardly directed radial projections 24 remain. After the cover has been rotated to its position, the top faces of the projections 23 on the cover rest against the bottom faces of the projections 24 at the opening, and the cover is locked thereby.

Another embodiment differing from the embodiment shown in FIG. 1 is illustrated in FIG. 3. In this construction the seal 18 is placed against the shoulder 11 on the cover 8. This location reduces the pressurized area of the sealing cover 14 and makes the constructional unit consisting of the cover 14 and the screws 19, 20 smaller. The annular projection 15 on the cover 14, which keeps the lock ring 10 in its groove, continues downwards down to the shoulder 11 on the cover 8.

Besides spherical, the closing member may also be shaped, e.g., as a segment of a ball or as a cylinder.

What is claimed is:

1. A valve comprising a housing having a through flow duct; an opening in said housing, sealing means in said duct and a closing member disposed in said housing in engagement with said sealing means so as to be rotatable between a position where flow through said housing is permitted and a closed position where flow is prevented, said closing member being of a size to permit insertion thereof through said opening in said housing; said closing member including a shaft engaged therewith for rotating said closing member, said shaft extending through said opening in said housing;

a first cover means for said opening in said housing and including a passage for said shaft of said closing member, said passage having seal means for sealingly engaging said shaft, a locking member for locking said first cover means with respect to said opening in said housing, said locking member including a stop face facing toward the interior of said opening in said housing, a second cover means detachably secured by first attachment means directly to said housing and be second attachment means directly to said first cover means, said second cover means including seal means between said second cover means and said housing and between said first cover means and said second cover means.

2. The valve as claimed in claim 1 wherein said seal means of said second cover means extends in a plane parallel to said first cover means.

3. The valve as claimed in claims 1 or 2 wherein said first cover means includes a recess and said locking member is a locking ring disposed in said opening of said housing and extending into said recess of said first cover means, said first cover means including a shoulder for engaging the portion of said locking ring projecting into said recess.

4. The valve as claimed in claims 1 or 2 wherein said opening in said housing includes a plurality of projections and said first cover means includes a corresponding plurality of projections which are engageable with said projections of said opening in said housing upon rotation of said first cover means with respect to said opening in said housing to lock said first cover means in said opening of said housing.

* * * * *